Figure 1:
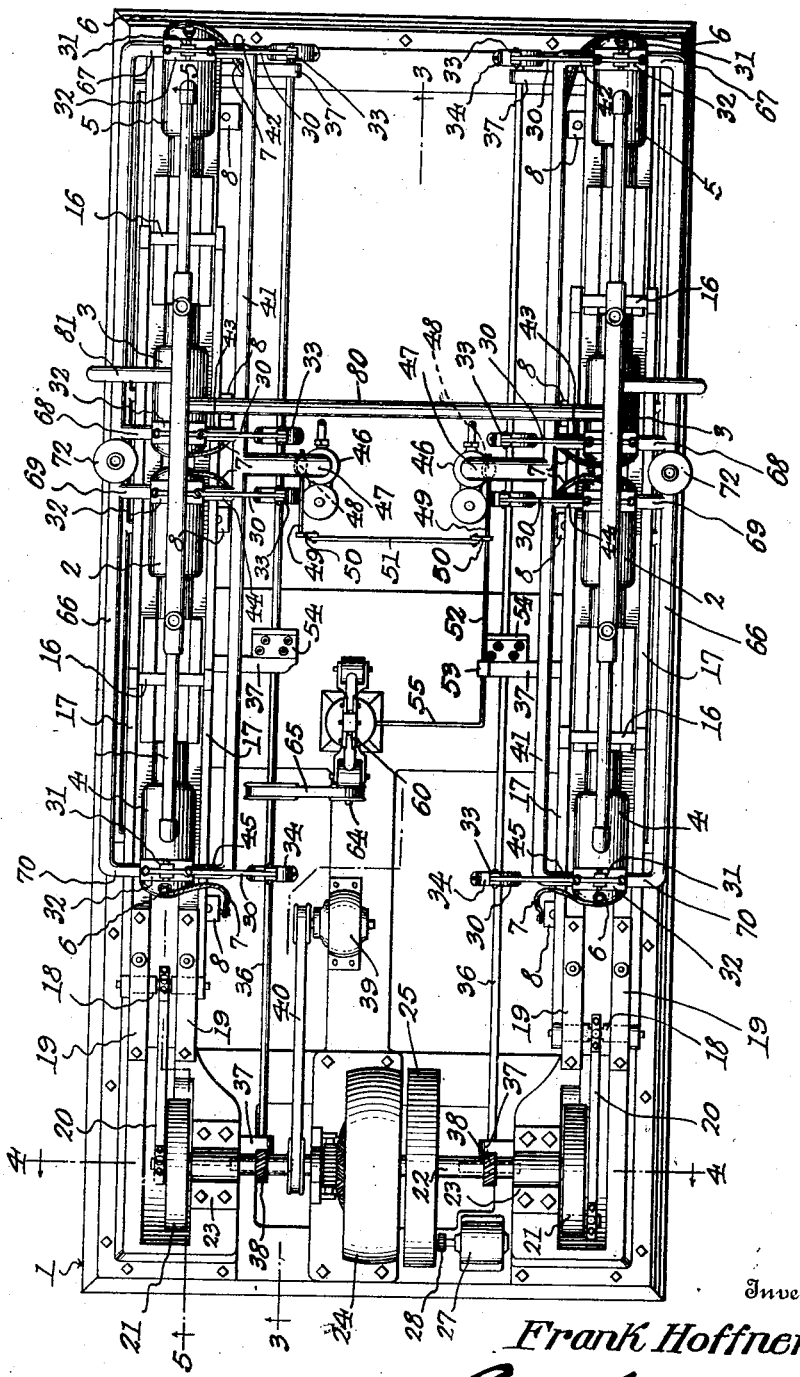

April 26, 1927.

F. HOFFNER 1,626,196

GASOLINE ENGINE

Filed May 31, 1924

4 Sheets-Sheet 1

Inventor
Frank Hoffner
By C.A.Snow&Co
Attorneys.

April 26, 1927.
F. HOFFNER
GASOLINE ENGINE
Filed May 31, 1924
1,626,196
4 Sheets-Sheet 2
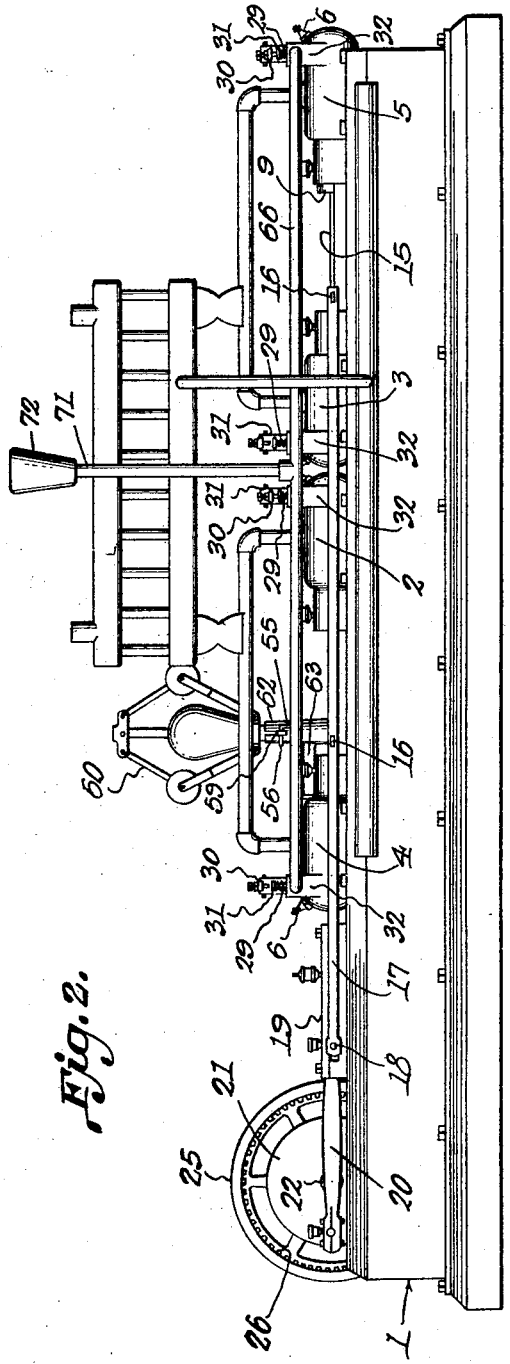
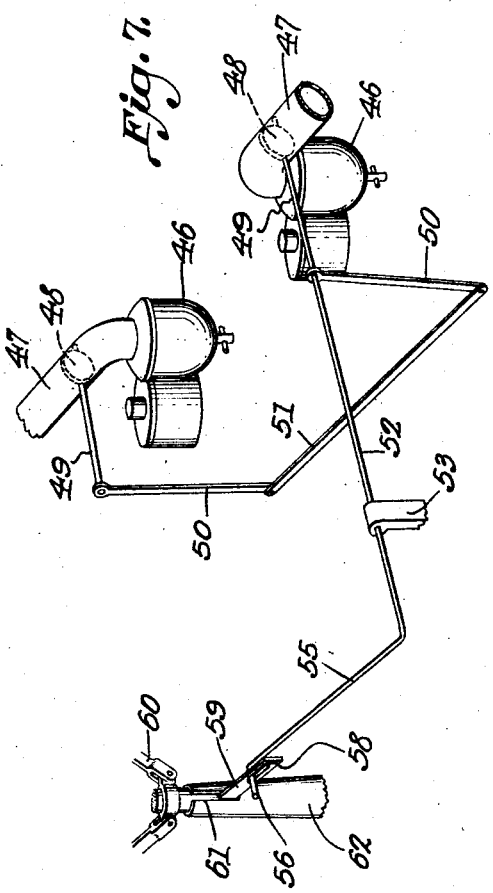
Inventor
Frank Hoffner
By C. A. Snow & Co.
Attorneys April 26, 1927. 1,626,196
F. HOFFNER
GASOLINE ENGINE
Filed May 31, 1924 4 Sheets-Sheet 3
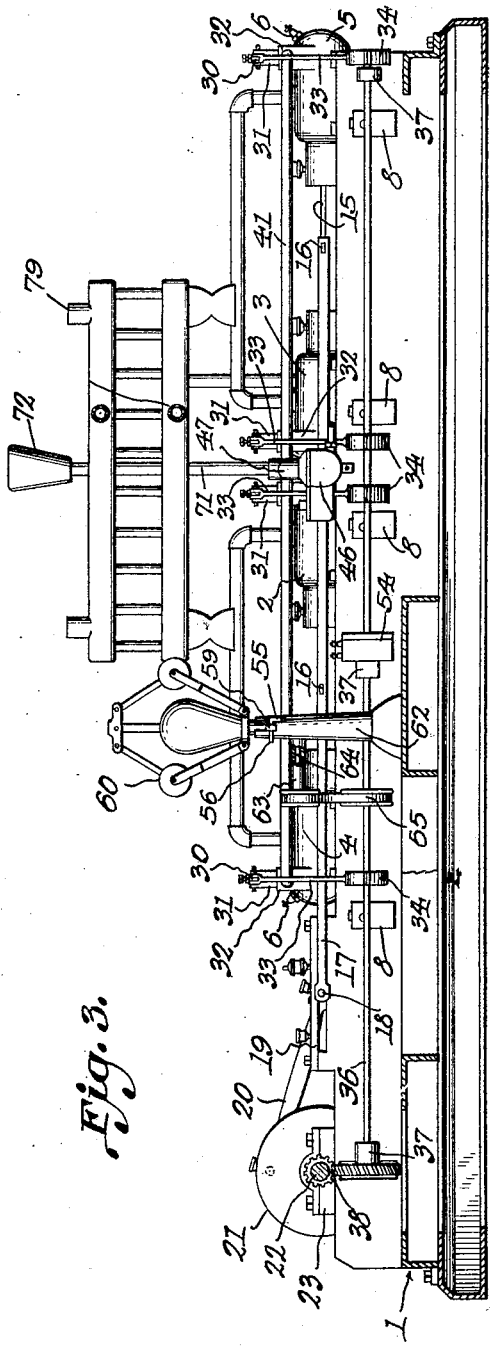
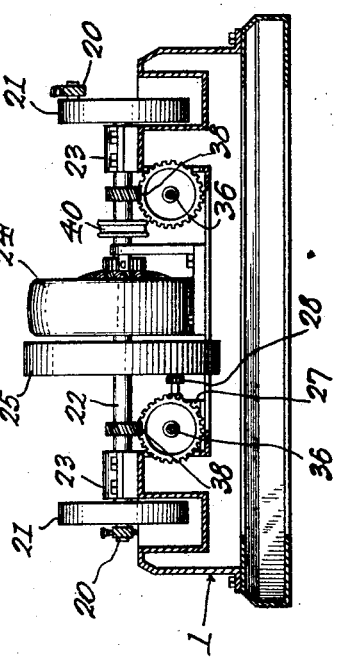
Inventor
*Frank Hoffner*
By C. A. Snow & Co.
Attorneys April 26, 1927.  1,626,196
F. HOFFNER
GASOLINE ENGINE
Filed May 31, 1924 4 Sheets-Sheet 4
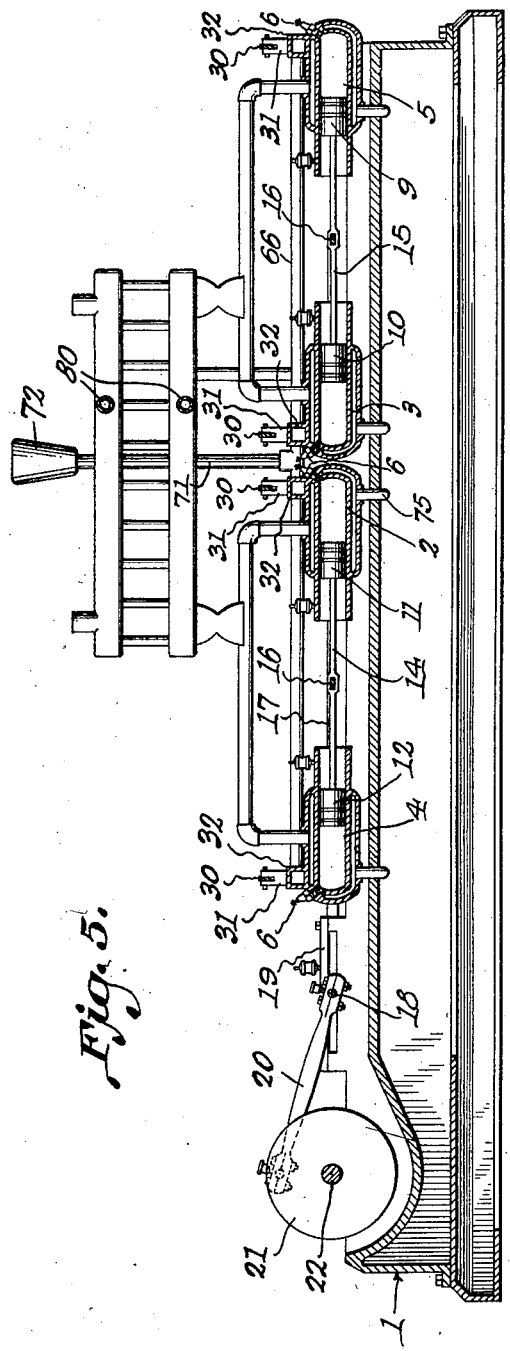
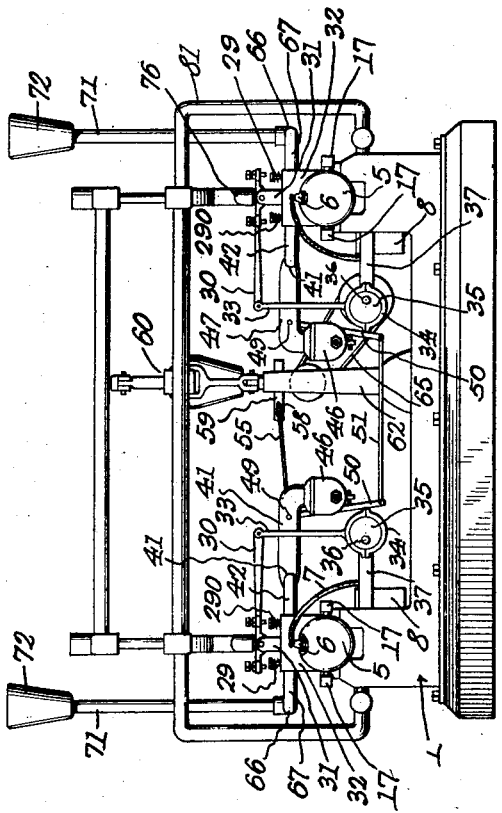
Inventor
Frank Hoffner
By C.A. Snow & Co.
Attorney Patented Apr. 26, 1927.

1,626,196

UNITED STATES PATENT OFFICE.

FRANK HOFFNER, OF NANTICOKE, PENNSYLVANIA.

GASOLINE ENGINE.

Application filed May 31, 1924. Serial No. 717,062.

The device forming the subject matter of this application is an internal combustion engine, and one object of the invention is to provide a novel layout so far as the cylinders, pistons and driven shaft are concerned: another object being to improve the control for the fuel mixture: a further object being to provide novel means for actuating the intake and exhaust valves: another object being to provide a novel cooling system: and yet another object being to improve generally and to enhance the utility of devices of that sort to which the invention appertains.

A preferred form has been depicted, but a mechanic, working within the scope of what is claimed, may make alterations without in anywise departing from the spirit or placing the utility of the device in jeopardy.

In the drawings:—Figure 1 shows in top plan, an engine constructed in accordance with the invention; Figure 2 is a side elevation; Figure 3 is a longitudinal section on the line 3—3 of Figure 1; Figure 4 is a cross section on the line 4—4 of Figure 1; Figure 5 is a longitudinal section on the line 5—5 of Figure 1; Figure 6 is an end elevation, wherein remote parts are omitted; Figure 7 is a perspective disclosing a portion of the governing mechanism for the carbureters.

The engine forming the subject matter of this application includes a base 1 and duplicate structures located adjacent to the longitudinal edges of the base, each of said structures including inner cylinders 2 and 3, and outer cylinders 4 and 5, all supported on the base 1. The cylinders 2, 3, 4 and 5 are fired by spark plugs 6 connected at 7 to coil boxes 8 on the base 1. Pistons 9, 10, 11 and 12 are mounted for reciprocation, respectively, in the cylinders 5, 3, 2 and 4. The pistons 11 and 12 are carried by rods 14, and rods 15 carry the pistons 10 and 9. The rods 14 and 15 are united by transverse connections 16 with slide rods 17 disposed on opposite sides of the cylinders 2—3—4—5, the slide rods being connected by cross heads 18 mounted for right-line reciprocation in guides 19 on the frame 1. Pitmen 20 are pivoted to the cross heads 18 and to crank disks 21 mounted on the ends of a shaft 22 journaled in bearings 23 on the base 1 adjacent to one end thereof. The shaft 22 may serve to drive a generator 24, although the engine may be employed for any desired purpose. A wheel 25 having an internal gear 26 (Figure 2) is secured to the shaft 22. An electric motor 27, constituting a starter, is carried by the base 1, and the shaft of the motor is provided with a pinion 28 shiftable into and out of engagement with the gear 26 of the wheel 25 on the shaft 22, any suitable means (not shown, and forming no part of the present invention) may be used for shifting the pinion 28.

Valve casings 32 are mounted on the cylinders 2—3—4—5, and in the casings, intake valves 290, and exhaust valves 29 operate. The valves 29 and 290 are under the governance of rock arms 30, extended transversely of the engine and fulcrumed intermediate their ends on standards 31 carried by the valve casings 32. The inner ends of the rock arms 30 are pivoted to depending links 33 provided at their lower ends with straps 34 cooperating with eccentrics 35 on valve shafts 36 extended longitudinally of the engine and journaled in bearings 37 projecting inwardly from the side portions of the base 1. One of the bearings at each side of the engine frame carries a timing mechanism 54, of any desired construction, the shafts 36 cooperating with the timing mechanisms. Through the instrumentality of interengaged spiral gears 38, the shafts 36 are connected with the shaft 22. A generator 39 is mounted on the base 1 and is connected with the shaft 22 by a belt and pulley drive 40, the generator constituting a part of the ignition system of the engine, if desired.

Intake manifolds 41 extend longitudinally of the engine, between the two groups of cylinders 2—3—4—5. The manifolds 41 have branches 42, 43, 44 and 45 communicating with the valve casings 32 of the respective cylinders 5—3—2—1. Carbureters 46 are located between the two groups of cylinders and are connected by pipes 47 with the respective manifolds 41. Valves 48 (Figure 7) operate in the pipes 47 and are carried by spindles or stems 49 extended longitudinally of the engine and journaled in the pipes 47, the shafts having depending arms 50 whereunto the ends of a link 51 are pivoted. One of the spindles or stems 49 is provided with an extension 52 journaled in a bearing arm 53 on one of the members 37, the extension being supplied with an arm 55 extended toward the longitudinal center of the base 1, as shown in Figure 1. Reverting to Figure 7, it will be observed that the arm 55 is supplied with a finger 56 received in an elongated slot 58 fashioned in a vertically movable part 59 of a fly ball governor 60, the member 59 being movable in a slot 61 formed in a pedestal 62 carrying the governor 60 and mounted on the base 1. As disclosed in Figure 3, the pedestal 62 is provided with a bearing 63 extended longitudinally of the engine, a shaft 64 being journaled in the bearing, and being operatively connected with the governor 60. By way of a belt and pulley drive 65, the shaft 64 is connected operatively with one of the valve shafts 36 which operate the valves 29 and 290.

Exhaust manifolds 66 extend along the engine, outwardly of the two groups of cylinders 2—3—4—5, and are connected by branches 67, 68, 69, and 70 with the valve casings 32 of the respective cylinders 5—3—2—4. Pipes 71 communicate with the manifolds 66, intermediate the ends thereof, and are provided at their upper ends with mufflers 72.

In practical operation, when the charges in the cylinders 2, 3, 4, and 5 are exploded, the pistons 11, 10, 9 and 12, together with the pistons rods 14 and 15, and the transverse connections 16, will impart reciprocation to the slide rods 17, the cross heads 18 moving in the guides 19, and the pitmen 20 rotating the shaft 22 by way of the crank disks 21.

From the shafts 22, rotation is imparted to the shafts 36 by the spiral gears 38, the eccentrics 35, the straps 34 and the links 33 swinging the rock arms 30 on their fulcra 31, the intake valves 290 and the exhaust valves 29 being operated in properly timed relation. From the valve casings 32 of the cylinders 4—2—3—5, the exhaust passes by the branches 70—69—68—67 into the manifolds 66, and leaves the manifolds through the pipes 71 and the mufflers 72. The mixture proceeding from the carbureters 46, passes by way of the pipes 47, the manifolds 41 and the branches 45, 44, 43 and 42 to the casings 32 of the respective cylinders 4—2—3—5, under the control of the inlet valves 290.

When the engine begins to operate at an excessive speed, the belt and pulley drive 65, imparting motion from one of the shafts 36 to the shafts 64, and operating the governor 60, causes the part 59 of the governor to move in the slot 61 of the pedestal 62 the finger 56 and the crank 55 of Figure 7 rotating one of the shafts 49 through the extension 52 of that shaft, the crank arms 50 and the link 51 effecting an operative connection between the shafts 49 and actuating the valves 48 to bring about a throttling action.

Having thus described the invention what is claimed is:—

In a device of the class described, oppositely disposed cylinders, fuel conduits discharging into the cylinders, valve spindles supported for rotation, throttle valves on said spindles and operating in the conduits, arms on said spindles, a link connecting said arms, a second arm on one shaft, a governor operatively connected with the second arm, a driven shaft, pistons operating in the cylinders, means for connecting the pistons operatively with the driven shaft, a second valve shaft supported for rotation, means for connecting the driven shaft with the second shaft, and means for connecting the second shaft with the governor.

In testimony that I claim the foregoing as my own, I have hereto affixed my signature.

FRANK HOFFNER.